United States Patent [19]

Swan et al.

[11] Patent Number: 4,706,478

[45] Date of Patent: Nov. 17, 1987

[54] ROTARY HANDLE OPERATED DOOR LOCK

[75] Inventors: Jye P. Swan, Brunswick Hills; Lee S. Weinerman, Median; Steven A. Mayo, Akron, all of Ohio

[73] Assignee: The Eastern Company, Strongsville, Ohio

[21] Appl. No.: 850,981

[22] Filed: Apr. 11, 1986

[51] Int. Cl.$^4$ .............................................. B60R 25/02

[52] U.S. Cl. ........................................ 70/208; 70/210; 292/336.3; 292/359

[58] Field of Search ................. 70/208, 209, 210, 211, 70/207, 201, 202, 182, 183, 184, 185; 292/207, 336.3, 359, DIG. 31; D8/338, 336; D3/72

[56] References Cited

U.S. PATENT DOCUMENTS

| | | | |
|---|---|---|---|
| D. 119,418 | 3/1940 | Anderson | 292/DIG. 31 |
| 243,374 | 6/1881 | Howard | 292/DIG. 31 |
| 789,568 | 5/1905 | Roe | 292/DIG. 31 |
| 1,652,660 | 12/1927 | Devereaux | 70/210 |
| 1,720,804 | 7/1929 | Tomcray | 70/210 |
| 2,136,854 | 11/1938 | Knott | 292/DIG. 31 |
| 4,270,780 | 6/1981 | Bernard | 70/210 |
| 4,438,964 | 3/1984 | Peters | 70/208 |

FOREIGN PATENT DOCUMENTS

| | | | |
|---|---|---|---|
| 834816 | 3/1952 | Fed. Rep. of Germany | 70/208 |

OTHER PUBLICATIONS

Eberhard Manufacturing Company Division of the Eastern Company Catalog No. 102 entitled "Handbook of Latches, Locks, Hinges Handles and Related Hardware", copyright date 1983.

*Primary Examiner*—Robert L. Wolfe
*Attorney, Agent, or Firm*—David A. Burge

[57] ABSTRACT

A rotary handle operated lock includes a pan-shaped housing member that has a back wall at the base of a forwardly facing recess. A guide member is welded to the rear face of the back wall and cooperates with the back wall to define a sturdy guide channel which slidably mounts a control member form movement between locked and unlocked positions. A shaft extends through aligned holes that are formed in the back wall and in the guide member, and through a keyhole shaped slot that is formed in the control member. The shaft has a front end region that carries a pivotally mounted, nestable operating handle, and a rear end region that carries a latching arm. The operating handle and the latching arm rotate with the shaft between latched and unlatched positions. The shaft has opposed flat side surfaces that are selectively engaged and released by the opposed flat sides of the keyhole shaped slot when the control member is moved to its locked and unlocked positions, respectively, whereby the shaft is prevented from rotating or permitted to rotate.

7 Claims, 34 Drawing Figures

ROTARY HANDLE OPERATED DOOR LOCK

BACKGROUND OF THE INVENTION

1. Field of the Invention

The present invention relates generally to a rotary handle operated door lock formed from a relatively small number of operating components that interact in particularly advantageous ways to selectively permit and prevent rotary latching and unlatching movements of an operating handle and a latching arm. More particularly, the invention relates to a door lock having a rotatable handle for pivoting a shaft-mounted latching arm between latched and unlatched positions, with a key operated locking system being provided for releasably retaining the rotatable components of the lock in their latched and unlatched positions.

2. Prior Art

Many proposals have been made for various types of door locks having flush mountable housings, for door locks having rotary operating handles that serve to rotate latching arms between latched and unlatched positions, and for door locks having operating handles that are nestable within recesses that are defined by associated housings. Despite such proposals, a need has remained for a flush mountable door lock having a rotatable operating handle for pivoting a latching arm between latched and unlatched posifions, with a key-operated locking system being provided to releasably retain rotatable components of the lock in their latched and unlatched positions, with the operating handle being nestable within a housing recess when the operating handle is in its latched and unlatched positions, and with the lock being formed from a minimal number of easily assembled parts that interact in advantageous ways to aid in securely preventing the operating handle and the latching arm from rotating both when the lock is "locked" and "unlocked."

To the degree that prior proposals have addressed the need for such a lock, such proposals often have resulted in locks of unduly complex construction with attendantly high costs of manufacture. A further drawback of some previously proposed lock assemblies is that they have employed components which are insufficiently rugged to withstand the type of abuse to which such locks are subjected, especially when unauthorized entry is attempted. Still another drawback of many prior proposals has resulted from an insufficiently effective interaction of the lock components when "locked" to prevent the action of the lock from being defeated by overpowering it with force.

While a variety of nestable operating handles are known for use with locks, one well accepted assembly of a nestable T-shaped handle, shaft and housing has been sold by Eberhard Manufacturing Company of Cleveland, Ohio 44136 under the product designation 5630A. A key-locking version of this product has also been offered under the product designation 4874.

SUMMARY OF THE INVENTION

The present invention overcomes the foregoing and other drawbacks of prior proposals by providing a novel and improved, relatively simple and inexpensive rotary handle operated door lock of rugged construction which utilizes a key operated locking system to releasably retain rotatable components in one or more predetermined positions relative to a housing, such as "latched" and "unlatched" positions.

In preferred practice, the operating handle of the lock is nestable within a housing recess when the handle is in either of its latched and unlatched positions. Additionally, a key operated locking system is provided to releasably "lock" the handle and a shaft-mounted latching arm against rotation relative to the housing when these rotatable components are in their latched and unlatched positions.

In accordance with the preferred practice of the present invention, a rotary handle operated, flush mountable door lock includes a pan-shaped housing that defines a forwardly facing recess. A shaft extends through a hole formed in a back wall of the housing. The shaft has a front end region that extends into the recess and pivotally carries an operating handle, and a rear end region that projects behind the back wall and carries a latching arm. The operating handle and the latching arm are rotatable with the shaft between latched and unlatched positions. The operating handle is preferably of T-shaped configuration and is pivotally connected to the front end region of the shaft for pivoting relative to the shaft to nest the handle within the recess. The operating handle is rotatable with the shaft through a range rotation of preferably about 180 degrees in moving the latching arm between its latched and unlatched positions. A receiving formation is provided on the shaft and is engageable by a locking formation on a control member to releasably retain the handle, the shaft and the latching arm from rotating out of their latched and unlatched positions. The receiving formation preferably includes a pair of flat surfaces formed on opposed sides of the shaft. The locking formation is defined by a control member that is slidably carried by the housing for movement along the back wall between locked and unlocked positions. Preferably the locking formation includes a keyhole shaped slot through which the shaft extends, with opposed parallel side walls of the slot being positioned closely alongside the opposed flat surfaces of the receiving formation on the shaft when the control member is in its locked position. The control member is moved between its locked and unlocked positions by a cam member that is rotated by a key operated lock cylinder. When the control member is in its unlocked position, a relatively large diameter end region of the keyhole shaped slot loosely surrounds the shaft to permit shaft rotation.

A significant feature of a door lock embodying the preferred practice of the present invention lies in a particularly secure type of interaction that takes place among its operating components to aid in resisting applications of force that are intended to overcome the action of the lock when "locked." Preferably, the key operated elements that are employed to "lock" a rotatable handle and a shaft-carried latching arm include an elongate control member that has a keyhole shaped locking formation slot near one end for selectively engaging and disengaging the shaft to permit and prevent its rotation, and a U-shaped formation near the other end that overlies, surrouds and interacts with a key-cylinder-operated cam to effect movement of the control member between its unlocked and locked positions, to securely retain the control member in its locked and unlocked positions, and to mutually reinforce the control member and the cam.

BRIEF DESCRIPTION OF THE DRAWINGS

These and other features and a fuller understanding of the invention described and claimed in the present application may be had by referring to the following description and claims taken in conjunction with the accompanying drawings, wherein:

FIG. 31 is a rear side elevational view showing an alternate lock embodiment that utilizes a T-shaped latching arm that has opposed portions which connect with cables for operating conventional remotely located latch bolt assemblies and the like;

DESCRIPTION OF THE PREFERRED EMBODIMENT

Figure 1:
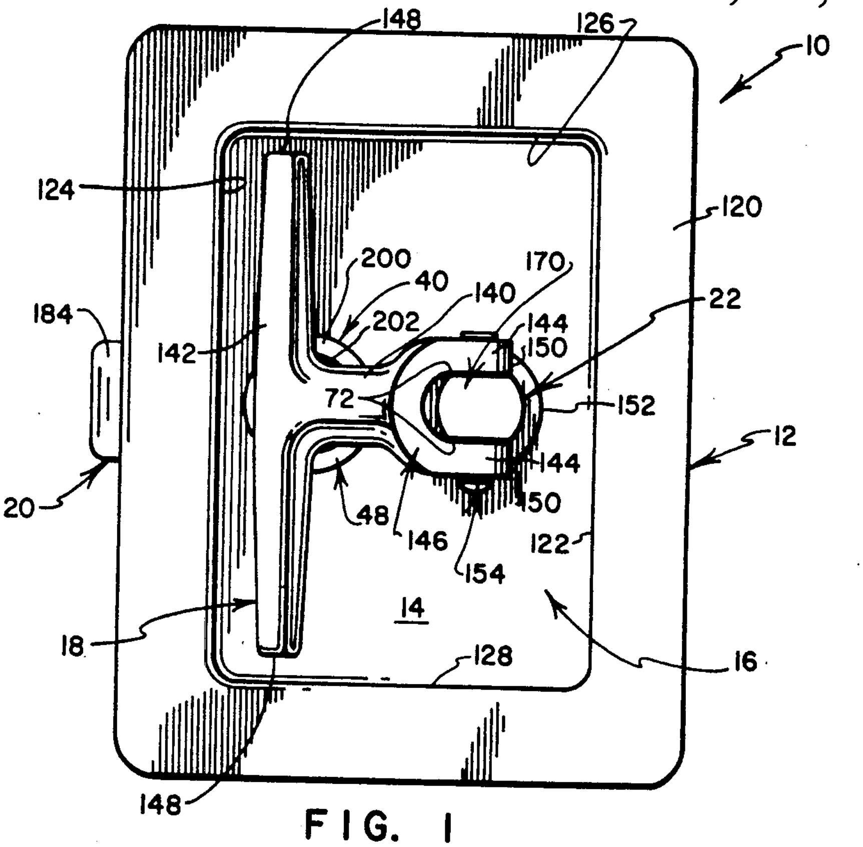
FIG. 1 is a front side elevational view of a lock embodying the preferred practice of the present invention with operating components of the lock positioned such that (1) the lock's operating handle is folded to a nested position relative to a recess defined by the housing of the lock, (2) the lock's latching arm is unlatched, and (3) the operating handle and the latching arm are "locked" by components of a key locking system to prevent rotation that would tend to move the latching arm out of its unlatched position.
Figure 2:
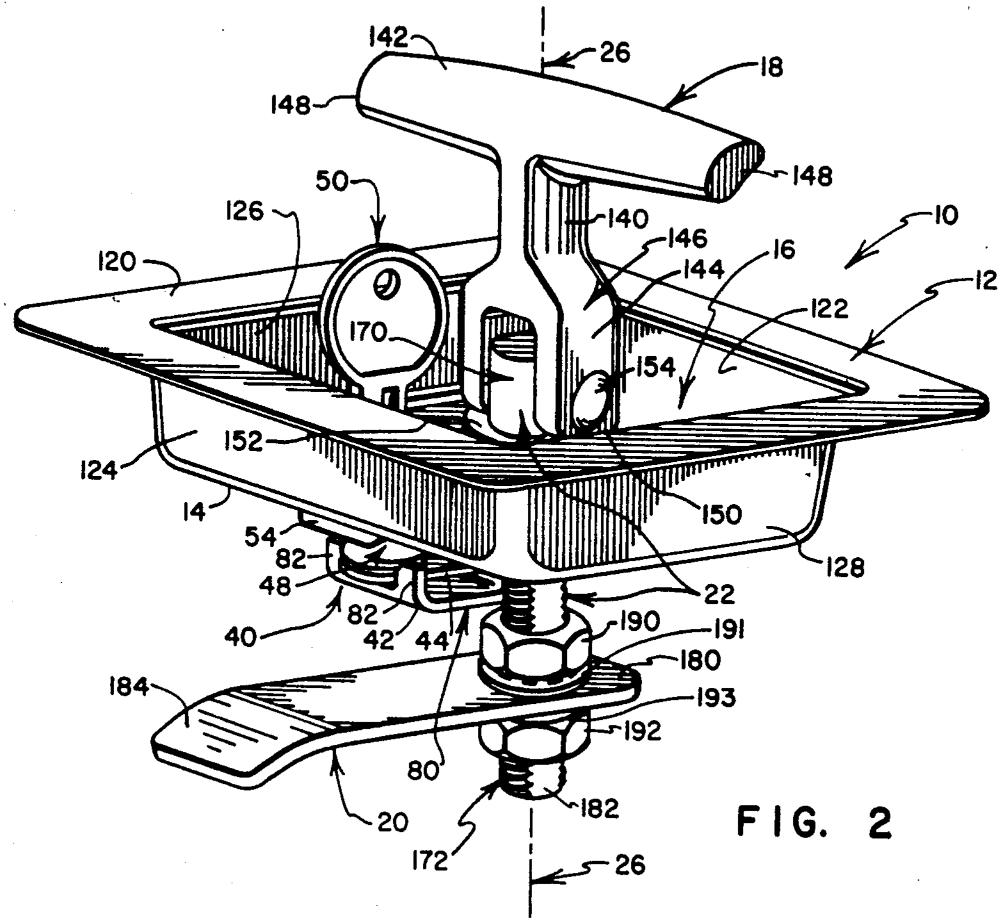
FIG. 2 is a perspective view thereof, but with the operating handle extended, and with a key inserted into a key cylinder of the lock.
Figure 3:
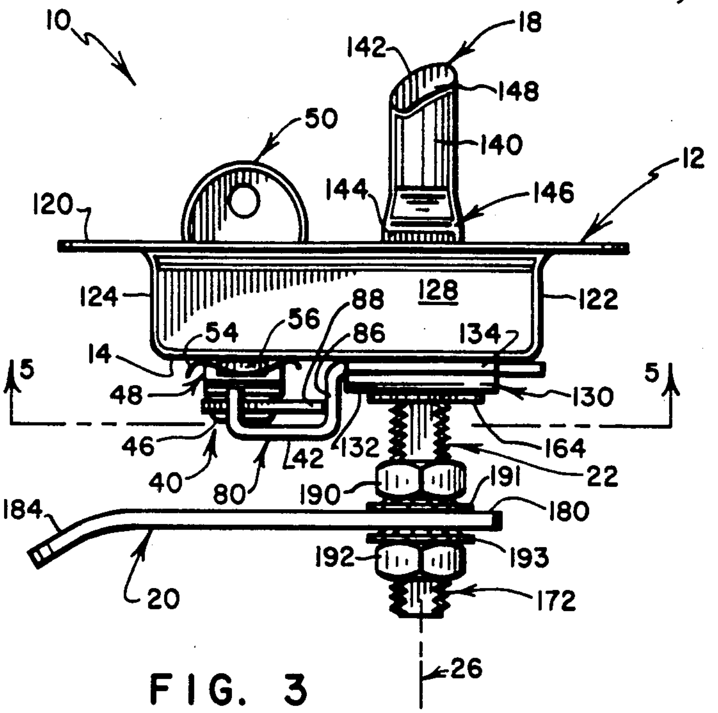
FIG. 3 is an end elevational view thereof.
Figure 4:
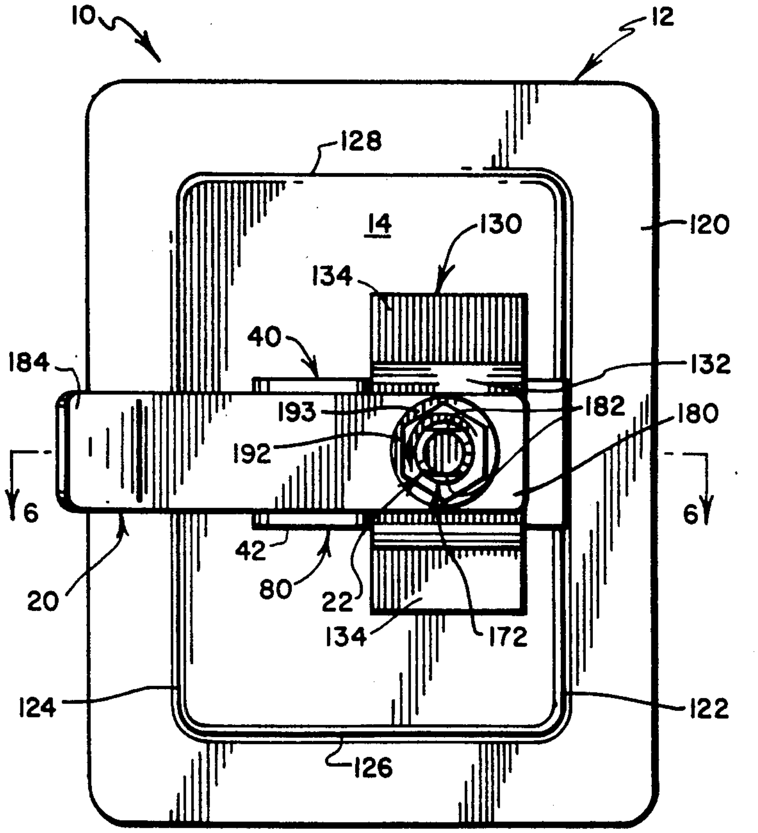
FIG. 4 is a bottom plan view thereof.

Referring to FIGS. 1-3, a rotary handle operated, flush mountable door lock embodying the preferred practice of the present invention is indicated generally by the numeral 10. The lock 10 includes a pan-shaped housing 12 which is ordinarily mounted on a closure (not shown). The housing 12 defines a forwardly facing recess 16, with a back wall 14 defining a base or back of the recess 16.

Figure 5:
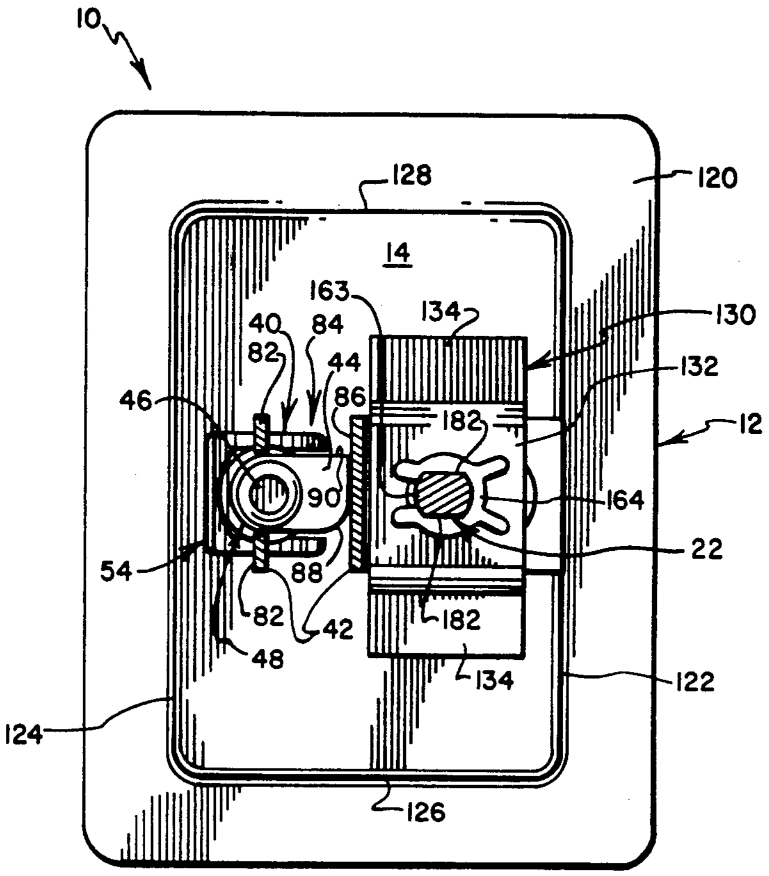
FIG. 5 is a sectional view as seen from a plane indicated by a line 5—5 in FIG. 3.
Figure 6:
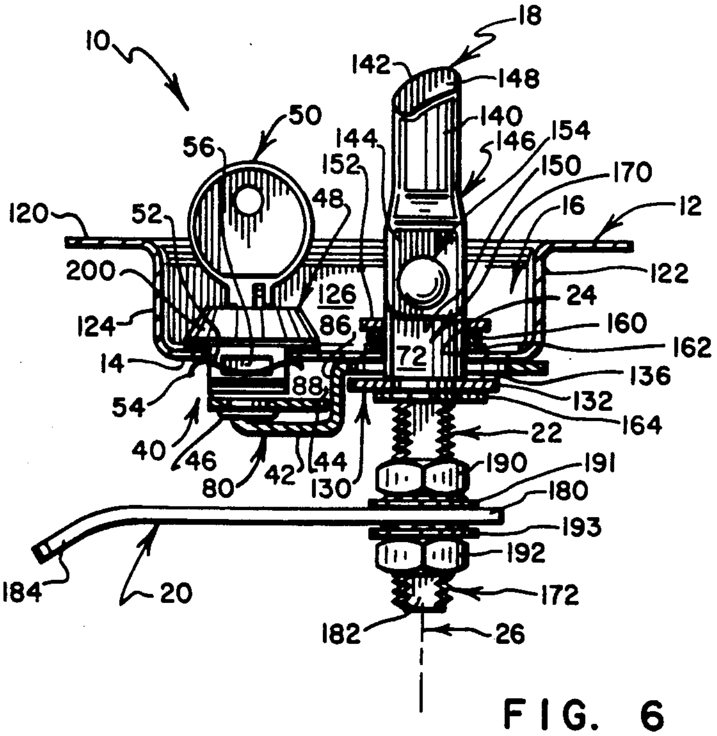
FIG. 6 is an end elevational view similar to FIG. 3 but with portions of selected elements of the lock broken away and shown in cross section as seen from a plane indicated by a line 6—6 in FIG. 4.

Referring to FIGS. 2 and 6, the lock 10 has an operating handle 18 that is located forwardly with respect to the back wall 14 of the housing 12, a latching arm 20 that is located rearwardly with respect to the back wall 14, and a rotatable shaft 22 that drivingly interconnects the handle 18 and the latching arm 20. The shaft 22 extends through an opening 24 (see FIG. 6) formed in the back wall 14. Thus, the shaft 22 is journaled by the housing 12 for rotation together with the operating handle 18 and the latching arm 20 about an imaginary axis 26 that extends perpendicular to the plane of the back wall 14. The operating handle 18 and the latching arm 20 are rotatable about the axis 26 between an unlatched position which is depicted in FIGS. 1–6, and a latched position which is depicted in FIGS. 13–17.

Figure 17:
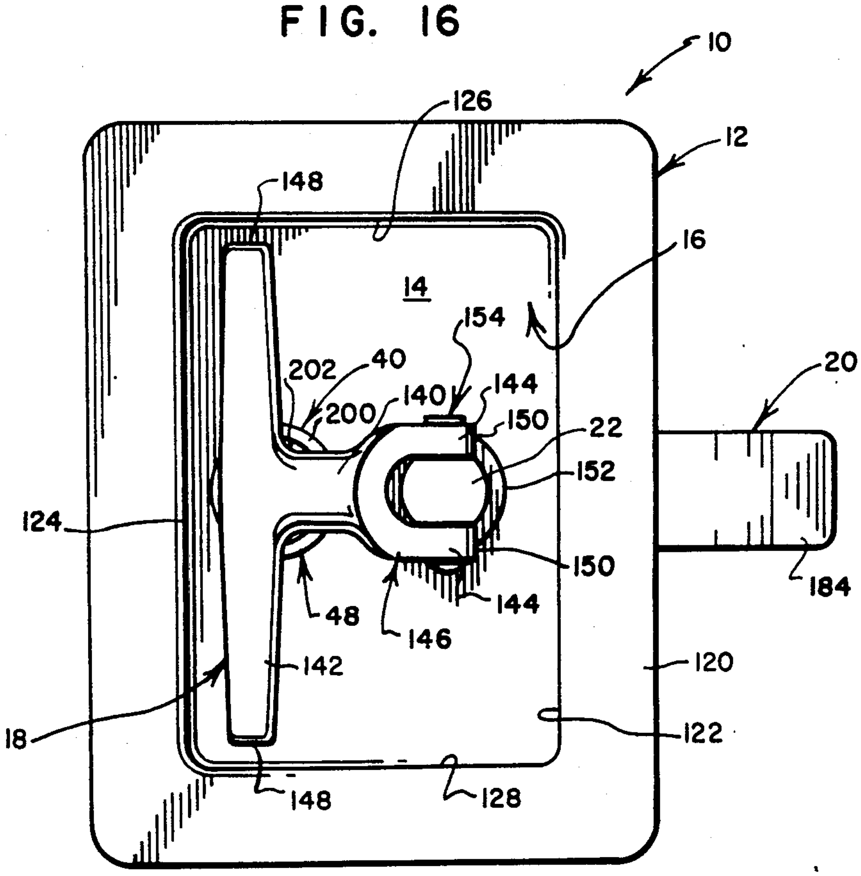
FIG. 17 is a top plan view thereof, but with the key removed the operating handled folded to its nested position.

When the operating handle 18 is in either of its unlatched and latched positions, it is nestable within the forwardly-facing recess 16 of the housing 12. Nesting of the handle 18 within the recess 16 while the handle 18 is "unlatched" is depicted in FIG. 1. Nesting of the handle 18 while "latched" is depicted in FIG. 17.

When the latching arm 20 is in either of its unlatched or latched positions, it projects to one side or the other of the housing 12. When the latching arm 20 is "unlatched," it projects only a slight distance (leftwardly as viewed in FIGS. 1, 4 and 6) beyond one side of the housing 12. When the latching arm 20 is "latched," it projects a substantial distance beyond the other side of the housing 12 (rightwardly as viewed in FIGS. 13, 15 and 17) for engagement with a suitable strike of conventional configuration (not shown).

As those skilled in the art will readily understand, a "strike" is a device or a formation that ordinarily is carried by a door frame (or other structure which surrounds or extends alongside an opening that is selectively closed by a closure on which a lock such as the lock 10 is mounted) to provide a cooperative structure for receiving and releasably retaining a retractable and extensible latch element such as the latching arm 20.

A key-operated locking system, indicated generally by the numeral 40, is provided for selectively permitting and preventing rotation of the interconnected operating handle 18, latching arm 20 and shaft 22 between their latched and unlatched positions. Stated in another way, the key-operated locking system 40 serves to selectively release and restrain the shaft 22 in order to either (1) release the operating handle 18, the latching arm 20, and the shaft 22 for free rotation about the axis 26, or (2) retain the operating handle 18, the latching arm 20, and the shaft 22 in one or the other of their latched and unlatched positions.

Figure 18:
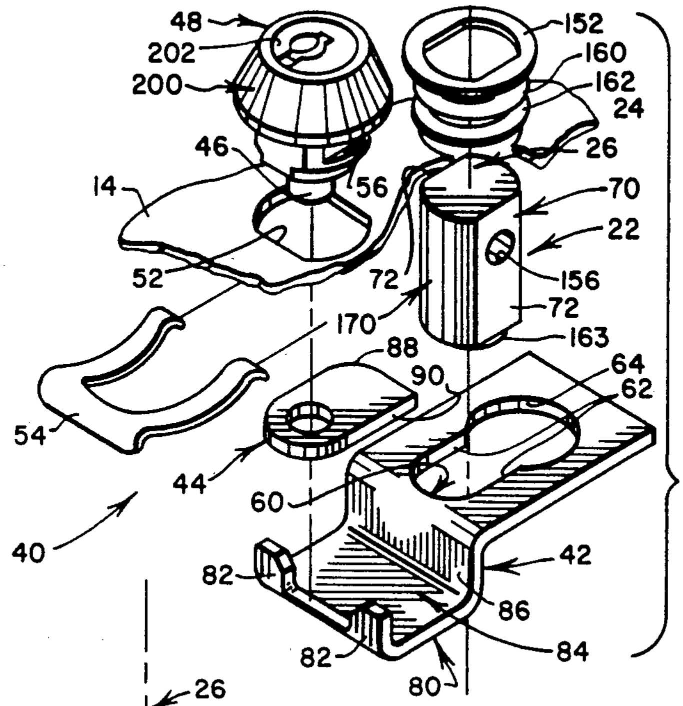
FIG. 18 is an exploded perspective view, on an enlarged scale, of selected elements of the lock.

Referring to FIGS. 5 and 6, the key-operated locking system 40 includes a control member 42 that is slidably mounted for movement along the back wall 14 of the housing 12, and a cam member 44 that connects with a rotatable stem 46 of a key cylinder assembly 48. The key cylinder assembly 48 is a conventional, commercially available unit that is mounted in a hole 52 that is formed through the back wall 14 of the housing 12, as is best seen in FIGS. 6 and 18. A conventional spring clip 54 engages grooves 56 formed in opposite sides of the key cylinder 48 to secure the key cylinder assembly 48 in place on the housing 12.

Figure 19:
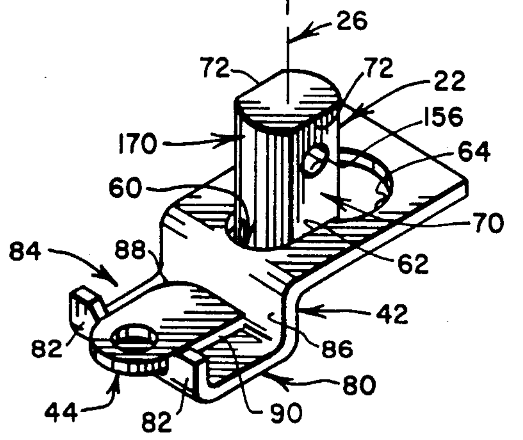
FIGS. 19, 20 and 21 are perspective views of the lock elements of FIG. 18 as they appear when components of the lock are in the "locked" positions of FIGS. 1-6 and 13-17, the "unlocked" position of FIGS. 7-9, and the "intermediate" position of FIGS. 10-12, respectively.
Figure 20:
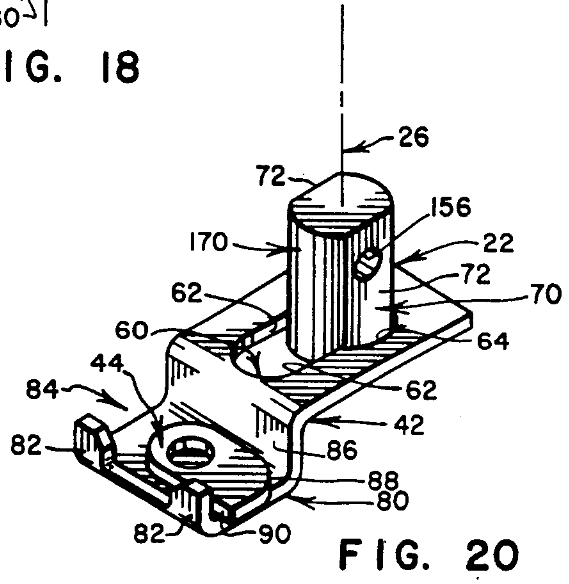

As will be explained in greater detail, the control member 42 is translatable along a sliding path of movement relative to the housing 12 between locked and unlocked positions in response to rotation of a suitably configured key 50 that is inserted into the key cylinder assembly 48. Referring briefly to FIGS. 18–20, when the control member 42 is in its locked position, a locking formation that is provided on the control member 42 (i.e., a keyhole shaped slot which is indicated generally by a numeral 60, and which has opposed parallel side walls 62 near one end of the slot 60, and an enlarged round end region 64 near the other end thereof) engages a receiving formation 70 that is provided on the shaft 22 (i.e., a region of the shaft 22 that is indicated generally by the numeral 70, having parallel flat surfaces 72 on opposed sides thereof) to "lock" the shaft 22 (and hence the operating handle 18 and the latching arm 20) against rotation (such locking engagement being illustrated in FIG. 19). The locking and receiving formations 60, 70 can be brought into "locked" or rotation-preventing engagement (as illustrated in FIG. 19) only when the drivingly interconnected operating handle 18, latching arm 20 and shaft 22 are in one or the other of their latched and unlatched positions.

Figure 21:
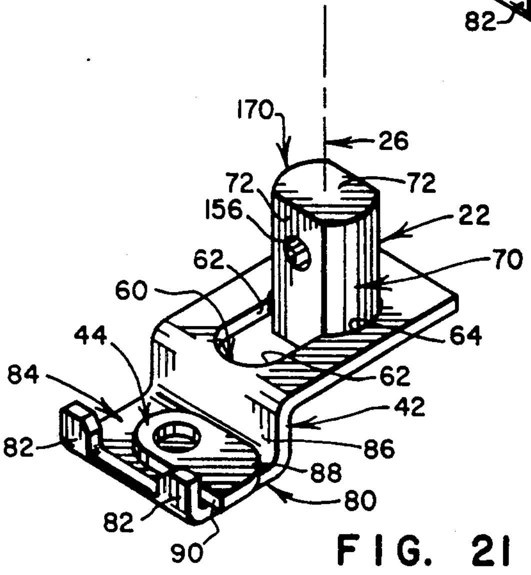

In an "unlocked" position, as is illustrated in FIGS. 20 and 21, the control member 42 is located with respect to the shaft 22 such that the enlarged diameter end region 64 loosely surrounds the shaft portion 70 and does nothing to inhibit rotation of the shaft 22 about the axis 26.

The positioning of the control member 42 is effected by the interaction of a cam 44 (which is rotated in response to rotation of the key 50 in the key cylinder 48) and a U-shaped formation 80 that is provided near one end region of the control member 42. The character of this interaction, which serves in combination with other features of the lock 10 to enhance the resistance of the lock 10 to force intended to overpower its action, will be described in greater detail.

Figure 7:
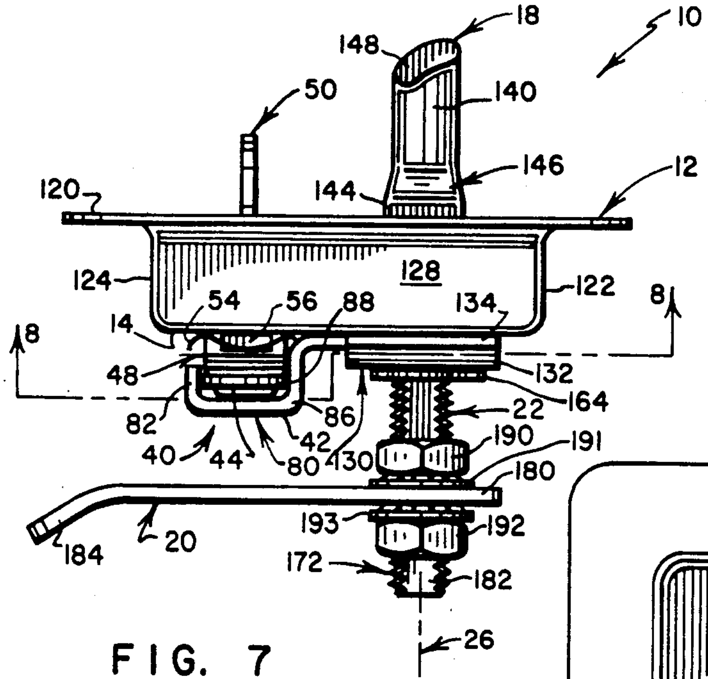
FIG. 7 is an end elevational view similar to FIG. 3 but with the key rotated in the key cylinder to reposition components of the key operated locking system to their "unlocked" position to release the operating handle and the latching arm for rotation.
Figure 8:
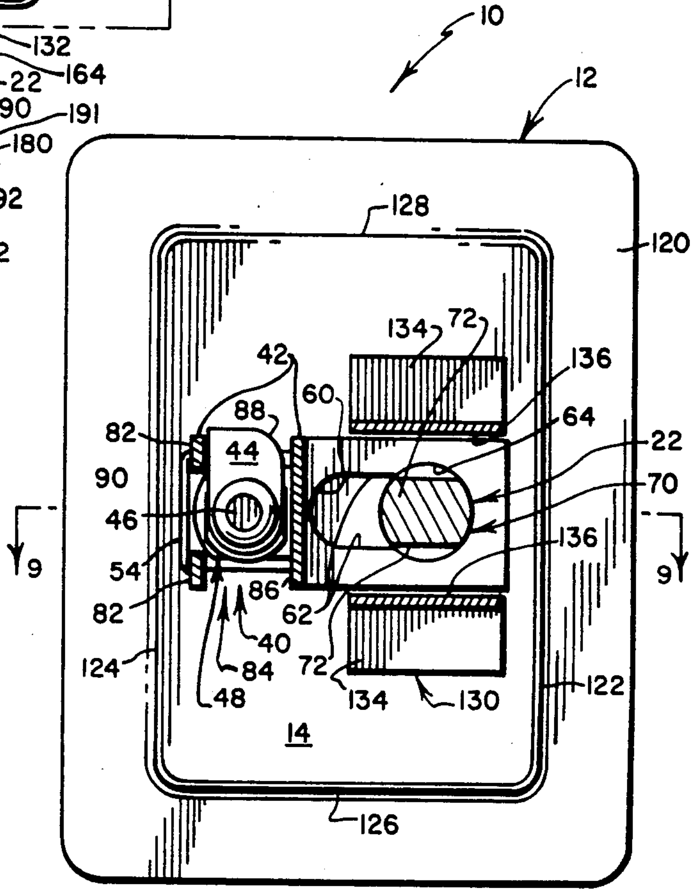
FIG. 8 is a sectional view as seen from a plane indicated by a line 8—8 in FIG. 7.
Figure 9:
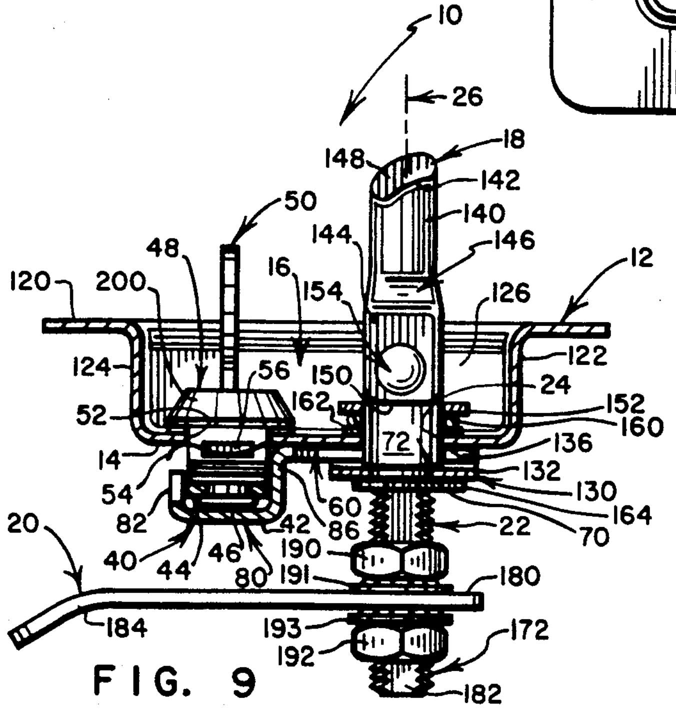
FIG. 9 is an end elevational view similar to FIG. 7 but with portions of selected elements of the lock broken away and shown in cross section as seen from a plane indicated by a line 9—9 in FIG. 8.
Figure 10:
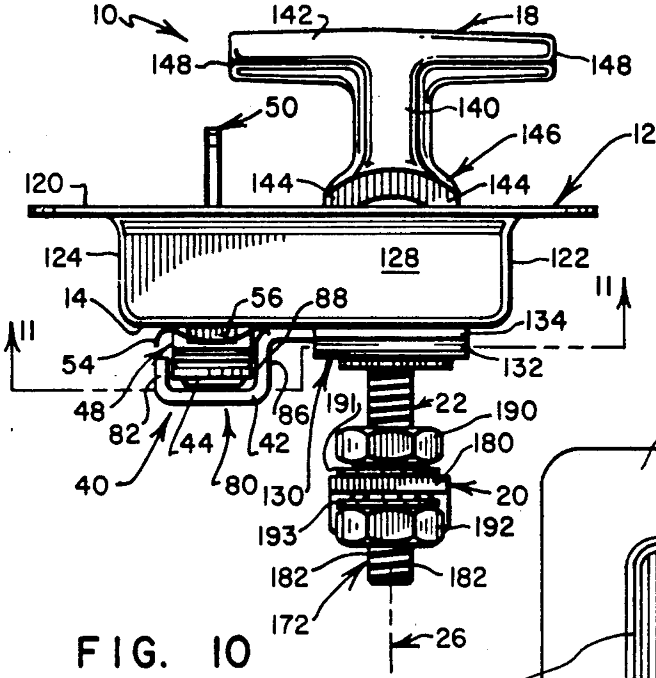
FIG. 10 is an end elevational view similar to FIG. 7 but with the operating handle and the latching arm pivoted to an "intermediate" position that is half-way between their latched and unlatched positions.
Figure 11:
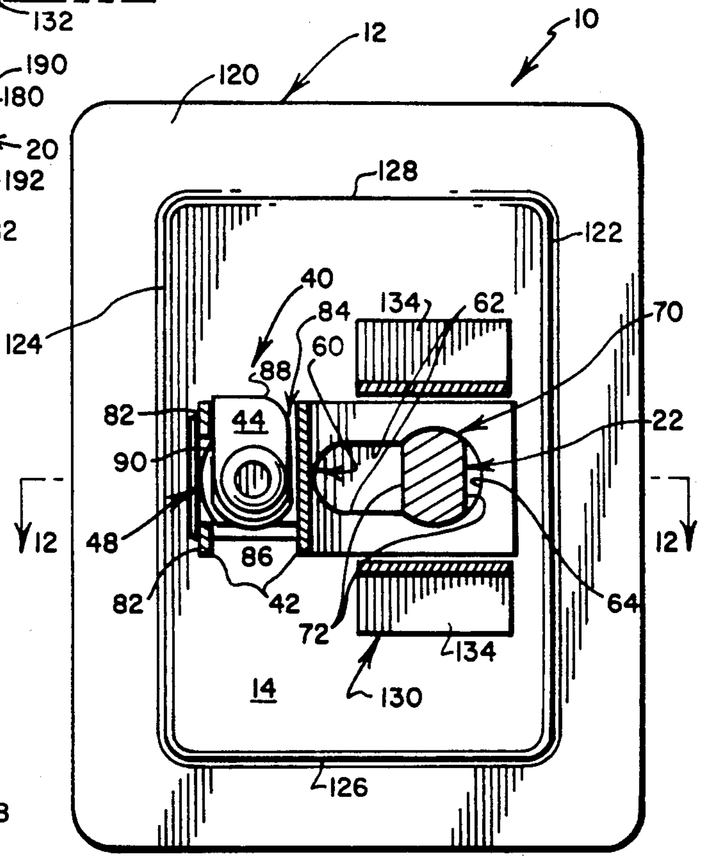
FIG. 11 is a sectional view as seen from a plane indicated by a line 11—11 in FIG. 10.
Figure 12:
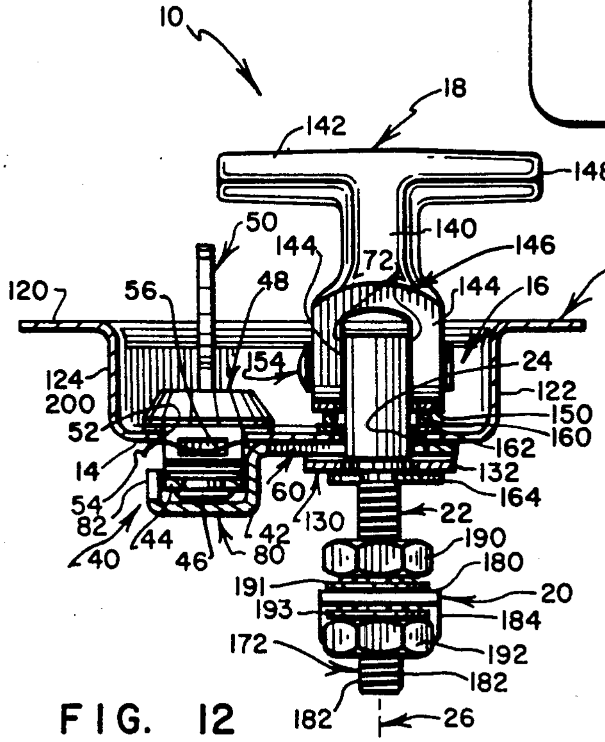
FIG. 12 is an end elevational view similar to FIG. 10 but with portions of selected elements of the lock broken away and shown in cross section as seen from a plane indicated by a line 12—12 in FIG. 11.
Figure 13:
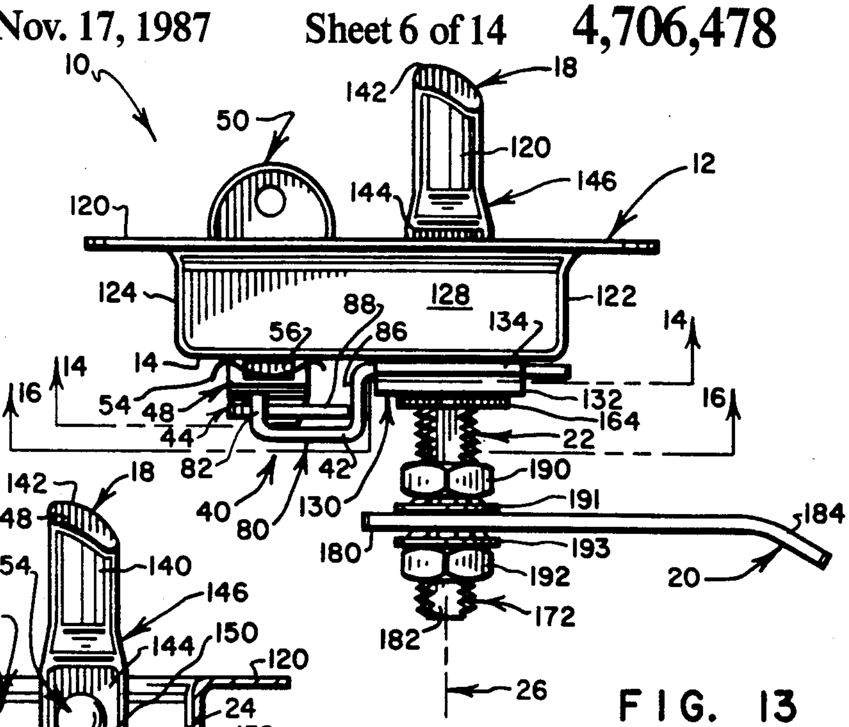
FIG. 13 is an end elevational view similar to FIG. 3 but with the operating handle and the latching arm in their latched positions, and with components of the key operated locking system "locked" to retain the operating handle and the latching arm in their latched positions.
Figure 15:
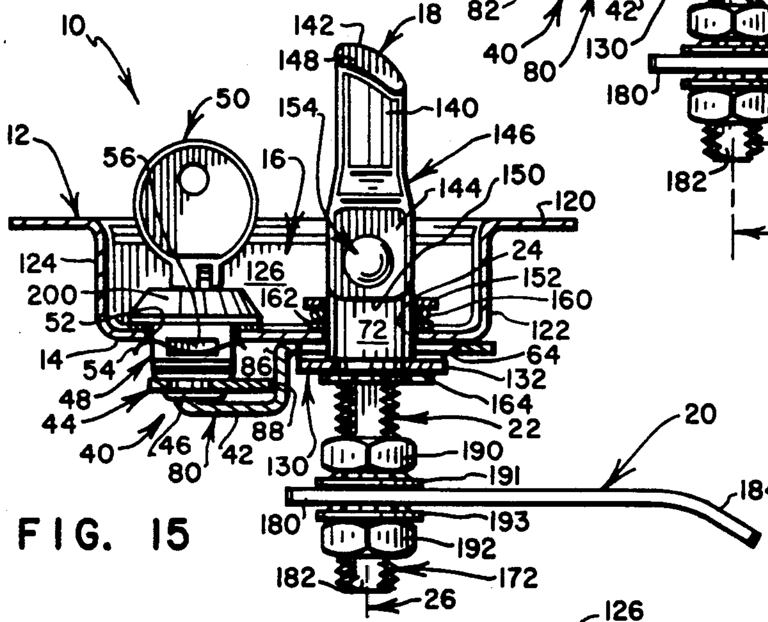
FIG. 15 is an end elevational view similar to FIG. 13 but with portions of selected elements of the lock broken away and shown in cross section as seen from a plane indicated by a line 15—15 in FIG. 14.
Figure 14:
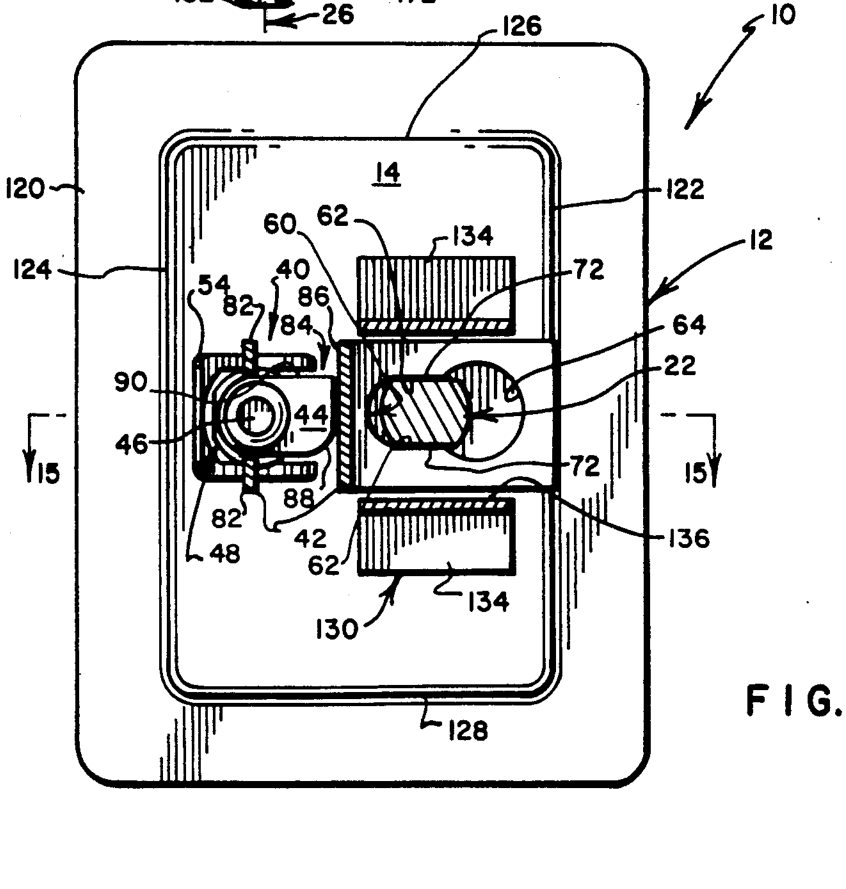
FIG. 14 is a sectional view as seen from a plane indicated a line 14—14 in FIG. 13.
Figure 16:
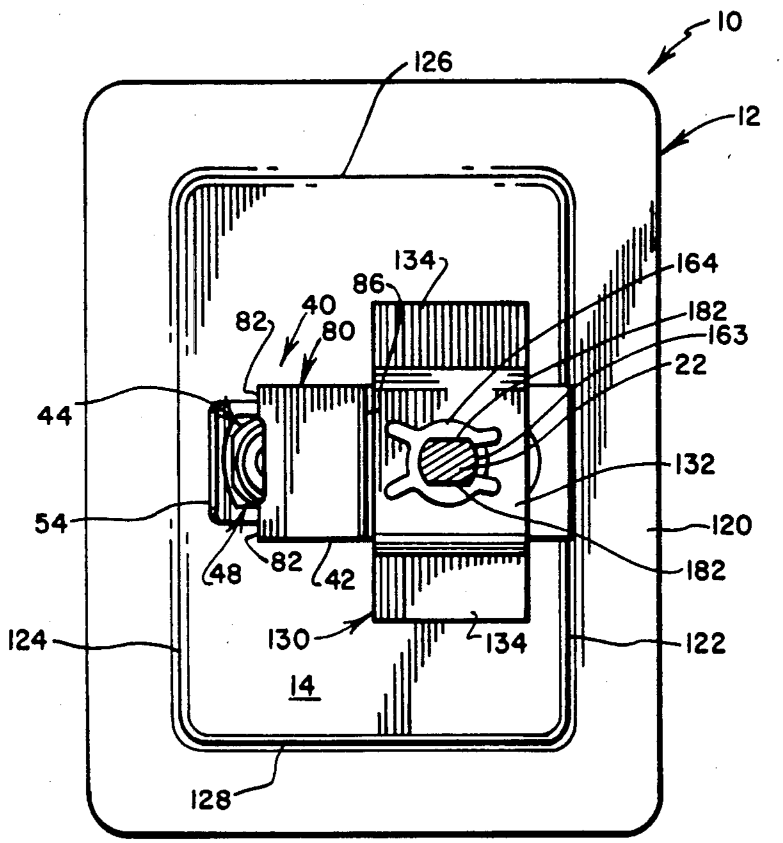
FIG. 16 is a sectional view as seen from a plane indicated a line 16—16 in FIG. 13.

As will be apparent from the foregoing summary, when the key 50 is inserted into the key cylinder assembly 48 and is turned to effect movement of the control member 42 to its unlocked position, which is illustrated in FIGS. 7–9, the T-shaped operating handle 18 may be turned to rotate the shaft 22 and the latching arm 20 about the axis 26 between the latched and unlatched positions which are illustrated, respectively, in FIGS. 1–9 and 13–17. When the latching arm 20 is in its latched position, it projects to a substantial degree beyond one side of the housing 12 (see FIG. 1) for engaging a suitably configured strike (not shown). When the latching arm 20 is its unlatched position, it projects in an opposite direction to only an incidental extent beyond the opposite side of the housing 12 (see FIG. 17). In its unlatched position, the latching arm 20 does nothing to engage a strike or to otherwise obstruct opening of a closure (not shown) on which the lock 10 typically is mounted.

The T-shaped operating handle 18 may only be nested within the recess 16 when the interconnected handle 18, latching arm 20 and shaft 22 are in one or the other of their latched and unlatched positions. Likewise, the control member 42 may only be moved to its locked position when the operating handle 18, the latching arm 20 and the shaft 22 are in one or the other of their latched and unlatched positions. By this arrangement, the lock 10 provides a secure means of releasably retaining the operating handle 18 and the latching arm 20 in their latched and unlatched positions.

Turning now to a more detailed description of the foregoing components, the housing 12 has a perimetrically extending mounting flange 120 which surrounds the recess 16. Referring to FIG. 1, the recess 16 is defined by the back wall 14, by opposed side walls 122, 124, and by opposed end walls 126, 128. Referring to FIG. 6, the hole 24 through which the shaft 22 extends is formed through the back wall 14 at a location closer to the side wall 122 than to the side wall 124, and at a location spaced equally from the end walls 126, 128. The mounting hole 52 for the key cylinder assembly 48 is formed through the back wall 14 at a location closer to the side wall 124 than to the side wall 122.

The housing 12 is preferably fabricated as a welded assembly of two stamped metal parts, one being the above-described structure which defines the flange 120, the back wall 14 and the wall portions 122, 124, 126, 128. Referring to FIGS. 3-8, the other part is a guide plate 130 which has a raised central region 132 bordered by a pair of mounting flanges 134 that are welded to the rear side of the back wall 14. The plate 130 and the back wall 14 of the housing 12 cooperate to slidably mount the control member 42 by defining a channel 136 (see FIGS. 8 and 9 located between the back wall 14 and the central region 132 within which one end region of the control member 42 is slidably carried for translation between the locked position of FIG. 19 and the unlocked position of FIGS. 20 and 21.

Referring to FIGS. 1 and 2, the T-shaped operating handle 18 has a stem 140 which interconnects a transversely extending bar 142 and a pair of spaced legs 144 that define a yoke 146. The transversely extending bar 142 has opposed ends 148. Referring to FIGS. 2 and 6, the legs 144 have slightly rounded but basically square cornered end regions 150 that engage a washer 152 which is carried on the shaft 22. As is best seen in FIG. 18, the washer 152 has a pair of opposed, inwardly facing flat surfaces 153 that are configured to lie closely alongside the opposed flat surfaces 72 that are formed on the shaft 22, whereby a driving connection is established between the washer 152 and the shaft 22. A pivot pin 154 extends through aligned holes (not shown) that are formed in the legs 144 of the yoke 146, and through a hole 156 (see FIG. 18) that is formed through the rotatable shaft 22. The pivot pin 154 is riveted to provide enlarged head formations at its ends which serve to retain the pin 154 in place and to thereby provide a secure pivotal interconnection between the handle 18 and the shaft 22.

The T-shaped handle 18 can only be nested within the recess 16 when the handle 18, the latching arm 20, and the shaft 22 have been rotated to one or the other of their latched or unlatched positions. When the handle 18 is nested in the recess 16, the bar 142 of the T-shaped handle 18 lies closely alongside the housing side wall 124, and the ends 148 of the bar 142 extend to within close proximity of the end walls 126, 128. By this arrangement, the handle 18 cooperates with the housing 12 to assist in preventing rotation of the shaft 22 (i.e., rotation of the shaft 22 when the handle 18 is nested within the recess 16 will tend to bring one or the other of the ends 148 into abutting engagement with one of the end walls 126, 128).

A pair of washers including a resilient washer or O-ring 160 and a rigid washer 162 (see FIGS. 6 and 18) are interposed between the washer 152 and the back wall 14 of the housing 12. The washers 152, 160 and 162 all encircle the shaft 22 and are arranged such that the washers 152, 162 sandwich the washer or O-ring 160. The washer or O-ring 160 serves both as a weatherproof seal that extends perimetrically about the back wall opening 24, and as a resilient member that biases the washer 152 into firm engagement with the square cornered end regions 150 of the legs 144, whereby a detenting action is provided which operates to assist in retaining the handle 18 in one of its extended or folded positions (the handle's extended position is shown in FIG. 2, and its folded or nested positions are shown in FIGS. 1 and 17). Stated in another way, the action of the resilient washer 160 in biasing the washer 152 forwardly away from the back wall 14, causes the washer 152 to impose forces on the square cornered end regions 150 of the legs 146 that tend to align one of the faces of the square cornered end regions 150 with the plane of the washer 152 to provide a detenting action.

Referring to FIGS. 2, 6 and 18, the shaft 22 has a forward end region 170 which extends forwardly with respect to the back wall 14 into the recess 16, and a threaded rearward end region 172 which projects behind the guide plate 130. Referring to FIG. 5, the shaft 22 has a circumferentially extending groove 163 that forms a transition between the forward and rearward end regions 170, 172, respectively. A spring retaining clip 164 of a conventional, commercially available type, is installed in the groove 163 and extends radially outwardly therefrom, as is best seen in FIG. 5, to engage the rear face of the central portion 132 of the guide plate 130.

The forward end region 170 has the flat surface portions 72 formed on opposed sides thereof. The flat surface portions 72 not only extend forwardly with respect to the back wall 14, but also extend for a short distance rearwardly with respect to the back wall, i.e., into the channel 136 that slidably mounts the control member 42.

The threaded rearward end region 172 of the shaft 22 extends through a hole (not shown) that is formed in an inner end region 180 of the latching arm 20. Opposed flat surfaces 182 (see FIG. 5) are formed on the threaded end region 172 to mate with correspondingly configured side wall formations (not shown) that define the hole in the latching arm 20 through which the threaded end region 172 extends, whereby a driving connection is formed between the shaft 22 and the latching arm 20. A pair of nuts 190, 192 are threaded on to the threaded rearward end region 172. A pair of toothed lock washers 191, 193 are clamped by the nuts 190, 192 against opposed sides of the latching arm 24.

An outer end region of the latching arm 20 is shown as having a curved end 184 that is configured to aid in making proper engagement with a suitably configured strike (not shown). However, the strike engaging end of the latching arm 20 may take any desired configuration that may be found to assist in properly engaging a suitably configured strike.

Referring to FIG. 18, the key locking assembly 48 may be of any of a wide variety of commercially available types which feature preferred characteristics that will now be described. The locking assembly 48 has a body 200 which extends through the mounting hole 52 and is held in place by the spring clip 54. A key receiving cylinder 202 is journaled by the body 200 for rotation through about a ninety degree range of movement between locked and unlocked positions (which are best illustrated by comparing the orientations of the key 50 in FIGS. 6 and 9). The stem 46 projects rearwardly from the key cylinder 202 (as an integral part thereof) and connects with the rotatable cam 44 for rotating the cam 44 in response to rotation of the key 50 in the key cylinder 202. The cam 44 is movable between a locked position shown in FIG. 5, and an unlocked position shown in FIG. 8. The key locking assembly 48 is arranged such that, once a suitably configured key 50 has been inserted therein, the key 50 can only be removed when the key cylinder 202, the cam 44 and the control member 42 are in a selected one of their locked and unlocked positions.

Referring to FIGS. 18-21, the manner in which components of the lock 10 interact to "lock" the interconnected operating handle 18, latching arm 20 and shaft 22 in their latched and unlatched positions is illustrated. A locking formation which is provided on the control member 42 takes the form of the described keyhole shaped slot 60, which has the described flat side walls 62 and the enlarged round end region 64. The shaft 22 has a receiving formation 70 which includes the described flat surfaces 72. The flat side walls 62 extend parallel to each other and are spaced from each other by a distance that is selected to permit side walls 62 to be slided into closely fitting juxtaposed relationship with the flat surfaces 72 of the shaft 22.

When the flat side walls 62 of the control member 42 are in position alongside the flat surfaces 72 of the shaft 22, the close fit between these mating elements 62, 72 operates to prevent the shaft 22 from rotating about the axis 26. Such a closely fitting; "locking" engagement of the formations 62, 72 can be effected either when the shaft 22 (and the interconnected operating handle 18 and latching arm 20) are in their latched and unlatched positions—but not when these elements are rotated out of their latched and unlatched positions.

The lock 10 is "locked" when the flat side walls 62 are juxtaposed with the flat surfaces 72 to prevent rotation of the shaft 22. Likewise, the lock 10 is "unlocked" when the flat side walls 62 are withdrawn from juxtaposition with the flat surfaces 72, i.e., when the enlarged rounded end region 64 of the slot 60 loosely encircles the shaft 22 so that the shaft 22 is free to rotate with respect to the housing 12.

A significant feature of the preferred practice of the present invention, as it is applied to the described and illustrated lock 10, resides in the interactive engagement that takes place between the control member 42 and the cam 44. The generally U-shaped formation 80 of the control member 42 overlies, surrounds and cooperatively engages the cam 44 so that the secure character of the mounting of the control member 42 on the housing 12 is enhanced, and so that the cam 44 is protectively enclosed and reinforced. When the control member 42 is in its locked position, as is shown in FIG. 19, the U-shaped formation 80 overlies the cam 44 and has a pair of tab formations 82 that extend on opposite sides of the cam 44 in the vicinity of the cam's connection with the key locking cylinder's stem 46, whereby the cam 44 and the control member 42 interact to protect and reinforce each other. When the control member 42 is in its unlocked position, as is shown in FIGS. 20 and 21, the U-shaped formation 80 defines a transversely extending channel 84 that fully houses the cam member 42. Moreover, the control member 42 has a transversely extending wall 86 which extends along one side of the channel 84 and which cooperates with a curved end 88 of the cam 44 to effect translation of the control member 42 between its locked and unlocked positions in response to rotation of the cam 44 between its locked and unlocked positions. Furthermore, the cam 44 has a flat side surface 90 that engages one of the tab formations 82 (as is shown in FIGS. 8, 11, 20 and 21) as the cam 44 is rotated by the stem 46 in moving from its locked to its unlocked position, whereupon the engagement of the surface 90 with one of the tab formations 82 serves to securely retain the control member 42 in its unlocked position until the cam 44 is again rotated to bring the curved end formation 88 into engagement with the wall 86 to move the control member 42 to its locked position.

The lock 10 may be mounted on a door panel or the like utilizing any of a variety of conventional means, including threaded fasteners, rivets, weld studs, blind mounting brackets, and the like, as will be described in conjunction with references to FIGS. 22–34. In FIGS. 22–34, the reference numeral 10 is used to indicate the basic type of lock that has been described in conjunction with references to FIGS. 1–21. Also, some of the other reference numerals that have been employed in FIGS. 1–21 are utilized in FIGS. 22–34 to designate the same kinds of features as have been described.

Figure 22:
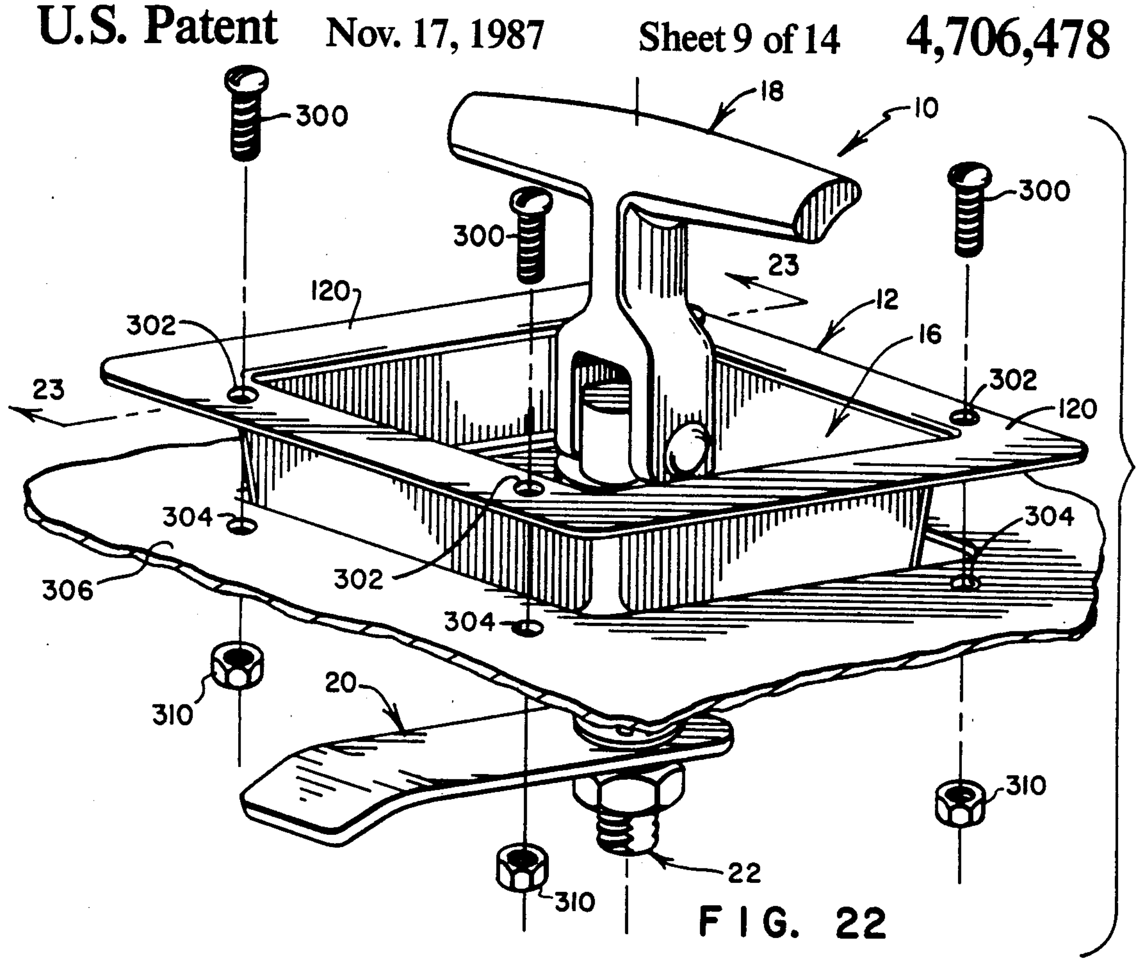
FIG. 22 is an exploded perspective view showing one means of mounting the lock in a door panel opening as by using conventional threaded fasteners that extend through aligned holes formed through a mounting flange of the housing through the door panel.
Figure 23:
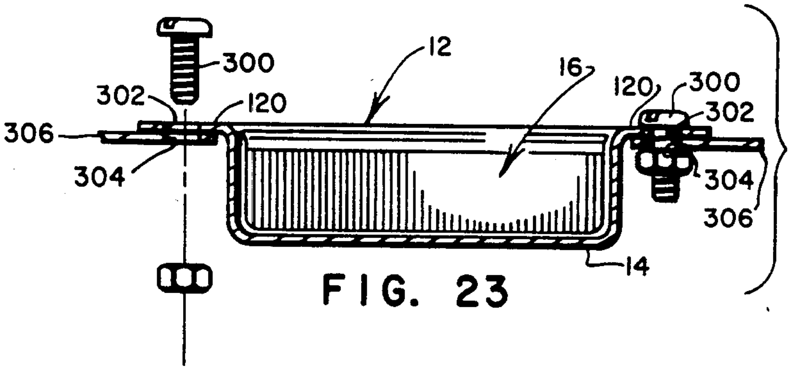
FIG. 23 is a sectional view as seen from a plane indicated by a line 23—23 in FIG. 22, but with one fastener explode and one in its installed position.

Referring to FIGS. 22 and 23, the use of threaded fasteners to mount the lock 10 on a door panel 306 is illustrated. Screws 300 are shown extending through aligned holes 302, 304 that are formed through the mounting flange 120 and through a door panel 306. Such portions of the lock 10 as extend rearwardly from the mounting flange 120 project through an opening 308 that is formed in the door panel 306. The screws 300 are held tightly in place by lock nuts 310.

Figure 24:
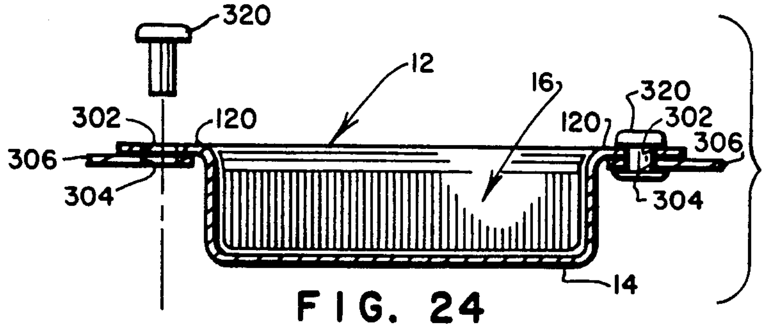
FIG. 24 is a sectional view similar to FIG. 23 but illustrating the use of conventional headed rivets in place of threaded fasteners to mount the lock on a door panel.

While threaded fasteners such as the screws and nuts 300, 310 may be employed to mount the lock 10, a more secure and permanent mounting is usually desirable, whereby other types of conventional fasteners such as rivets are substituted to extend through the aligned sets of holes 302, 304. Referring to FIG. 24, the use of rivets 320 that extend through the aligned holes 302, 304 in substitution for the screws 300 is illustrated.

Figure 25:
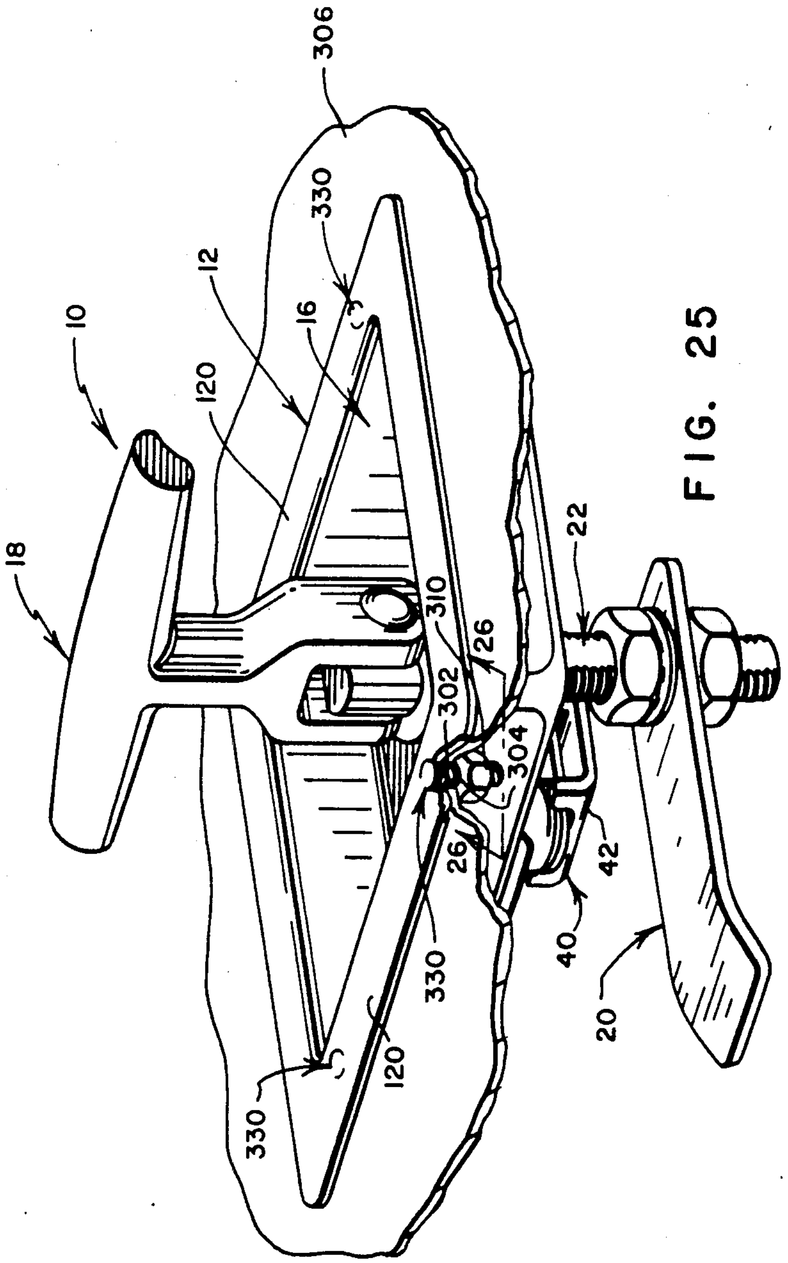
FIG. 25 is a perspective view showing an alternate means of mounting the lock on a door panel as by utilizing studs that are welded to a mounting flange of the housing.
Figure 26:
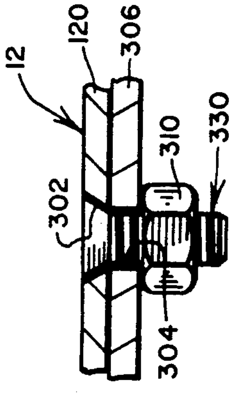
FIG. 26 is a sectional view, on an enlarged scale, as seen from a plane indicated by a line 26—26 in FIG. 25.
Figure 27:
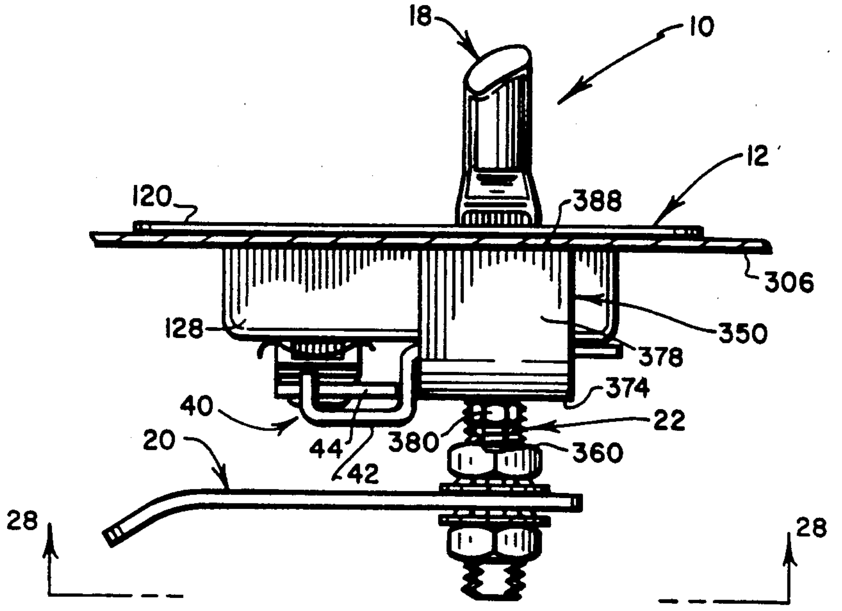
FIG. 27 is an end elevational view similar to FIG. 3 but depicting still another alternate means of mounting the lock on a door panel as by utilizing a U-shaped mounting bracket that is fastened to the rear wall of the housing of the lock utilizing studs that are welded to the rear wall and that extend through holes formed in the bracket.
Figure 28:
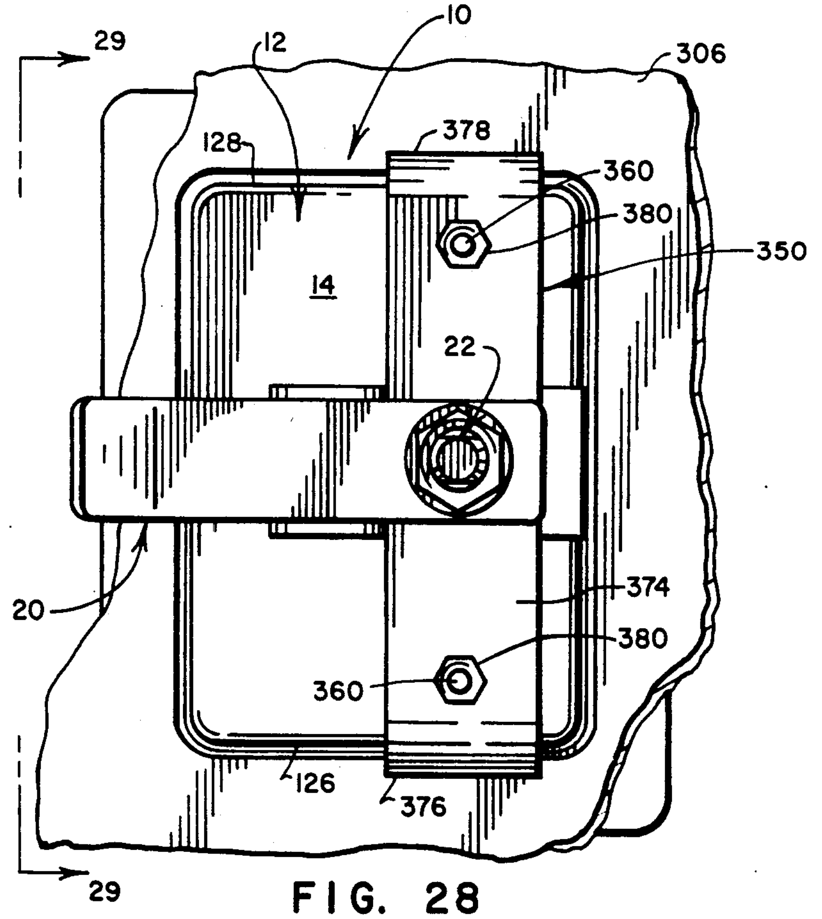
FIG. 28 is a rear side elevational view thereof as seen from a plane indicated by a line 28—28 in FIG. 27.
Figure 29:
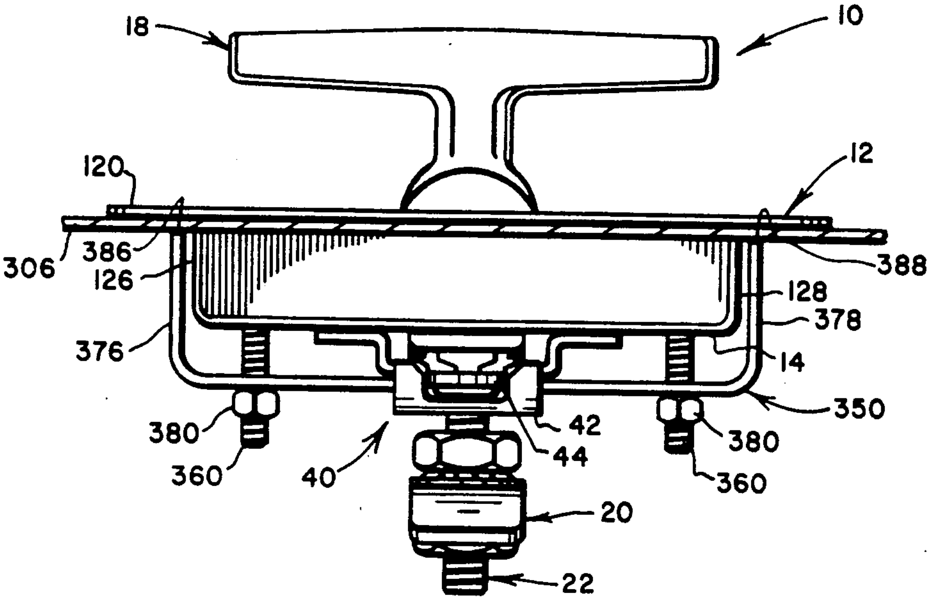
FIG. 29 is an elevational view as seen from a plane indicated by a line 29—29 in FIG. 28.

Referring to FIGS. 25 and 26, the use of threaded studs 330 in place of the screws 300 is illustrated. The threaded studs 330 typically are inserted through the holes 302 that are formed in the flange 120 (the holes 302 are shown in FIG. 22). The studs 330 may be securely connected to the flange 120 as by being press-fitted into the holes 302, and/or by welding the studs 330 to the flange 120. The studs extend through the holes 304 and receive nuts 310 that serve to securely retain the lock 10 in place on the door panel 306.

Figure 30:
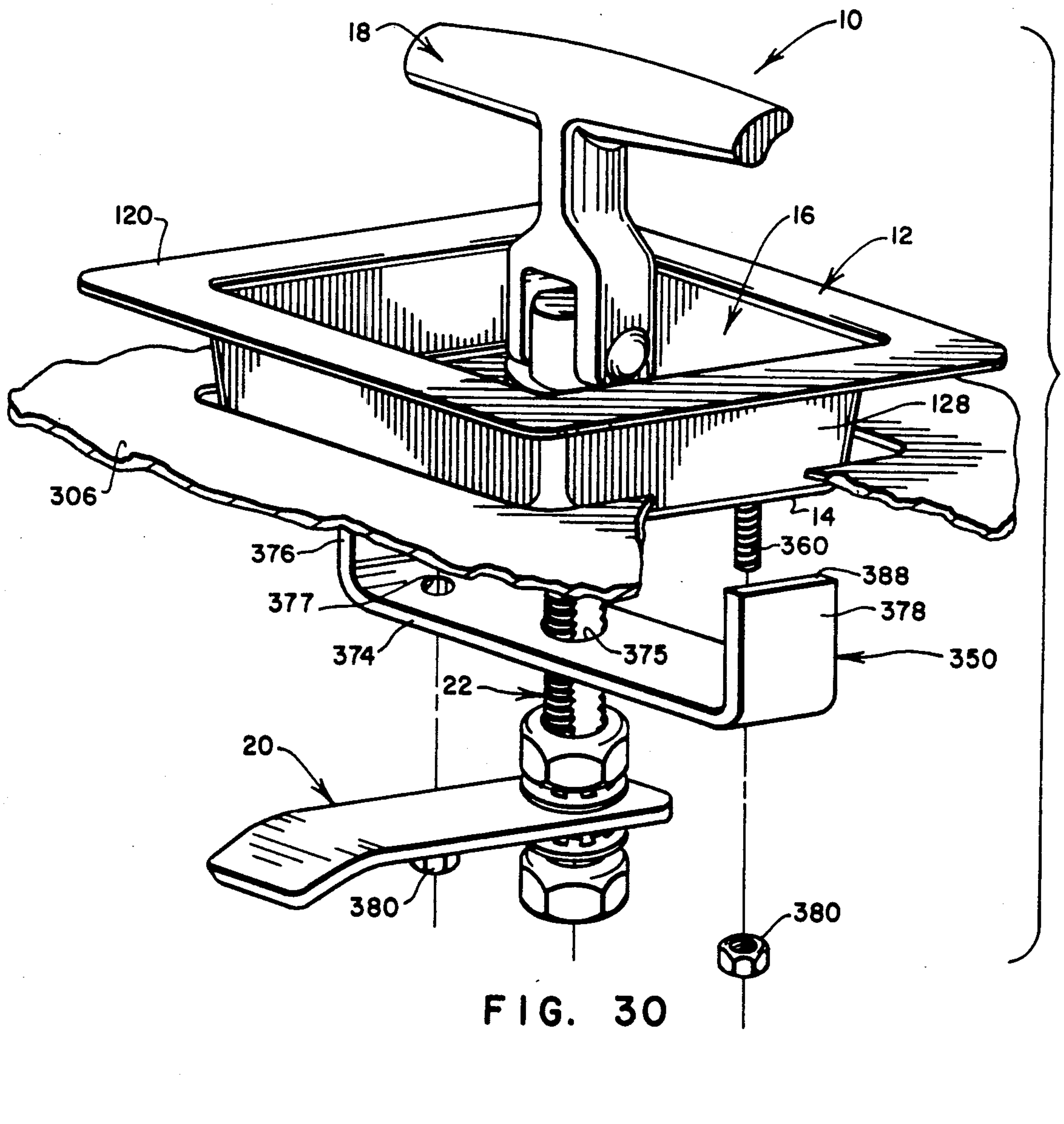
FIG. 30 is an exploded perspective view showing components of the system of FIGS. 27—29.
Figure 31:
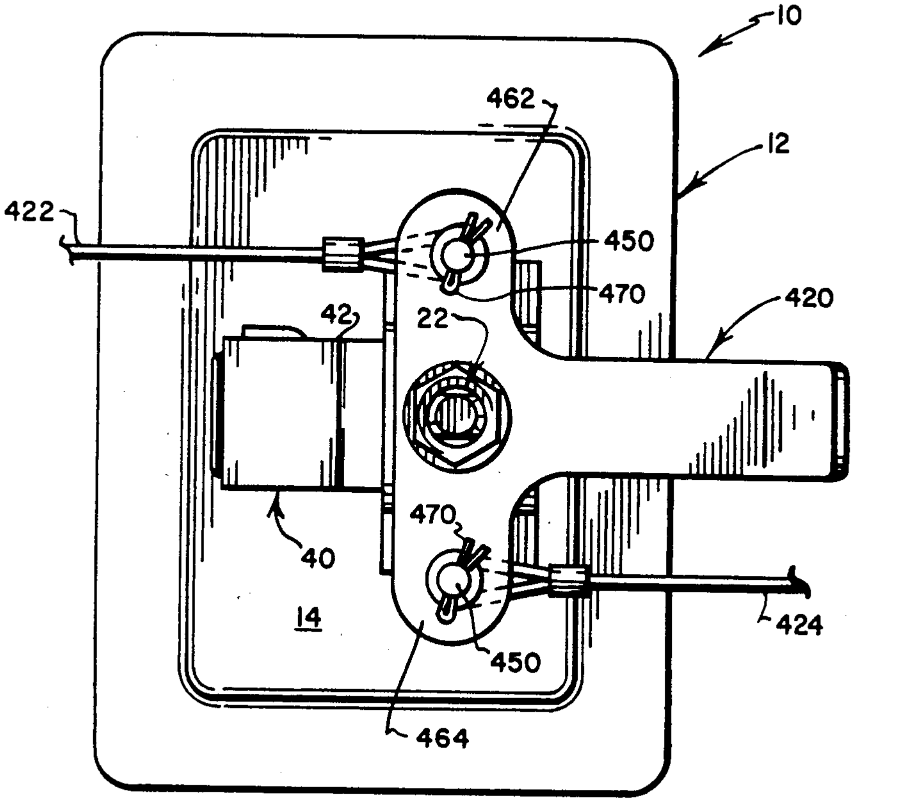
Figure 32:
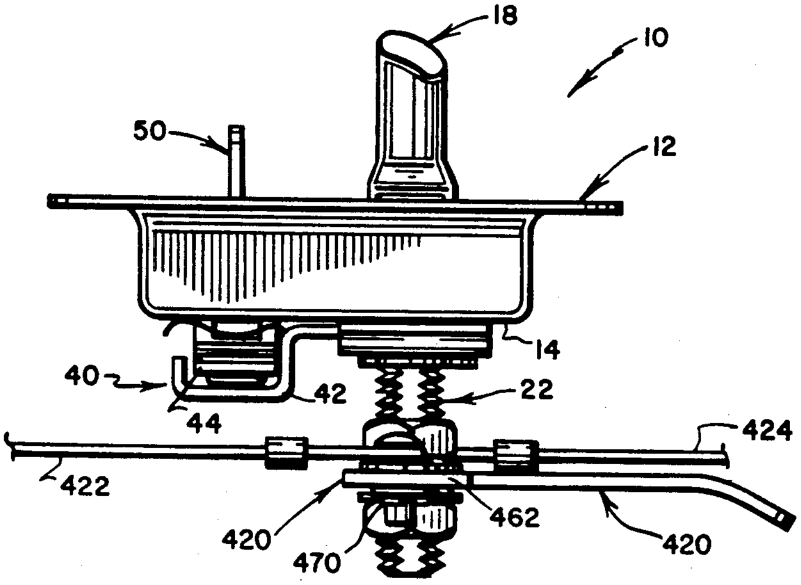
FIG. 32 is an end elevational view thereof.

Referring to FIGS. 27–30, the use of a U-shaped blind mounting bracket 350 to mount the lock 10 on a door panel 306 is illustrated. In this embodiment, a pair of threaded studs 360 are rigidly connected to the back wall 14 of the housing 12 (typically as by welding). The U-shaped bracket 350 has a pair of forwardly extending legs 376, 378 that are interconnected by a transversely extending leg 374. As is best seen in FIG. 30, a hole 375 is formed through the transversely extending leg 374 to loosely receive the shaft 22. Two holes 377 (only one of the holes 377 is visible in FIG. 30) are formed through the transversely extending leg 374 on opposite sides of the hole 375 to receive the threaded studs 360. A pair of lock nuts 380 are used to clamp the transversely extending leg 374 between the nuts 380 and the back wall 14. As the nuts 380 are tightened, distal ends 386, 388 (see FIG. 29) of the legs 376, 378 are moved alongside the end walls 126, 128 of the housing 12 to clamp portions of the door panel 306 between the distal ends 386, 388 and the mounting flange 120.

Locks that embody features of the present invention are not limited in their utility to such applications as require only a single latching element 20 to hold a closure in its closed position. Rather, as is illustrated in FIGS. 31–34, a T-shaped latching arm 420 may be employed in place of the latching arm 20 to provide connections with a pair of flexible cables 422, 424 (see FIGS. 31 and 32) or with a pair of rigid operating rods 432, 434 (see FIGS. 33 and 34) that connect with other latch elements of a conventional nature such as a pair of spring-projected latch bolt assemblies (not shown). Typical commercially available latch bolt assemblies of the type that may be connected to and operated by the cables 422, 424 or the rods 432, 434 are sold by Eberhard Manufacturing Company, Cleveland, Ohio 44136, under the model designations 10-5597 and 5638U. Many other conventional forms of latch assemblies likewise may be operated by cables or rods that connect with the T-shaped latching arm 420.

Figure 33:
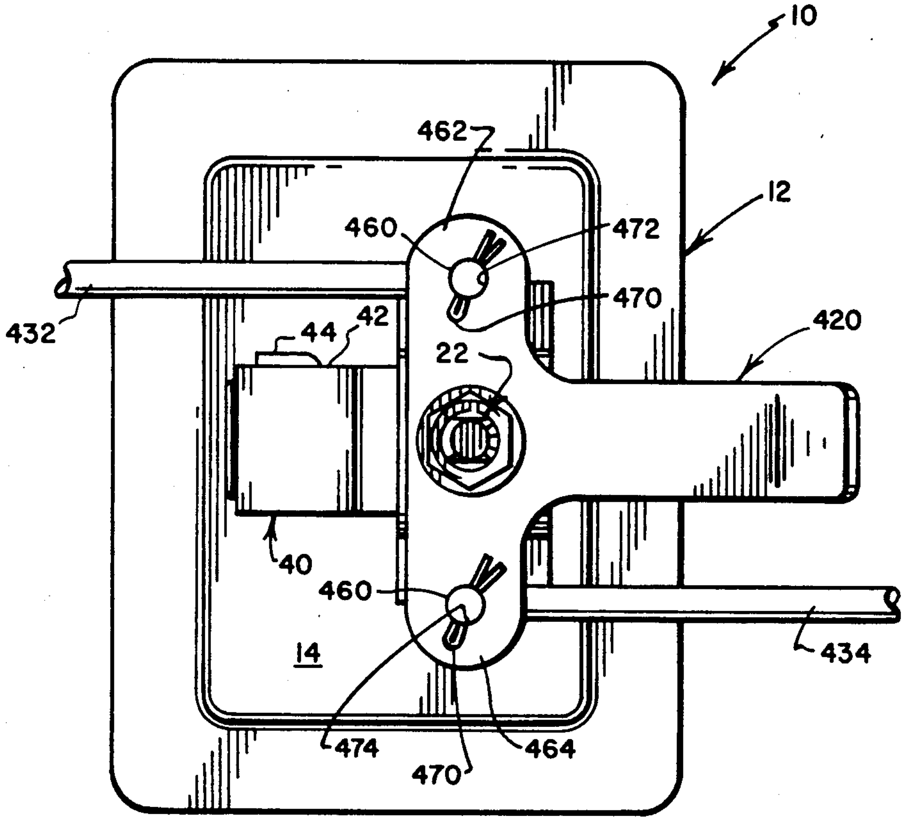
FIG. 33 is a rear side elevational view showing the lock embodiment of FIG. 31 connected to rods for operating conventional remotely located latch bolt assemblies and the like; and, FIG. 34 is an end elevational view thereof.
Figure 34:
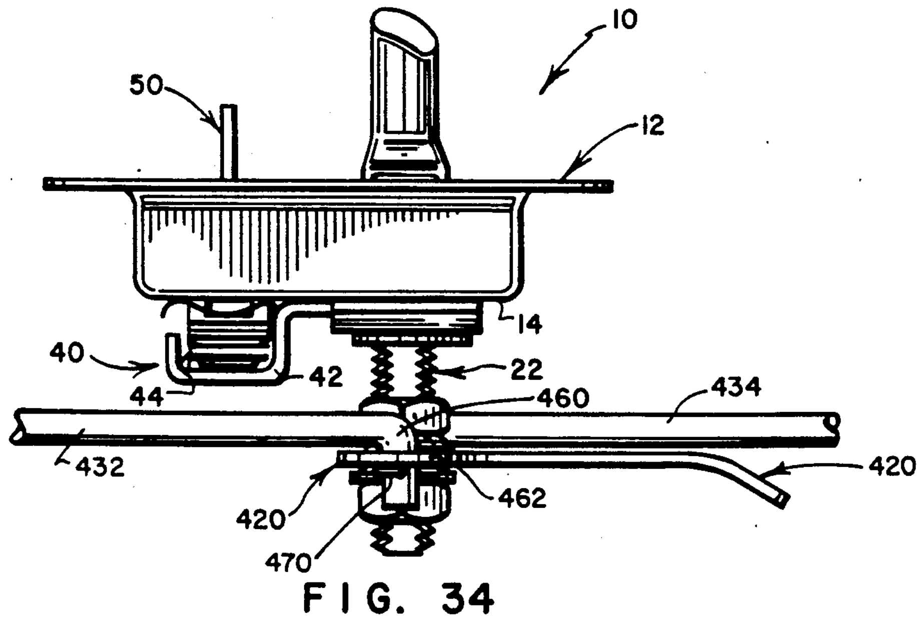

Referring to FIGS. 31–34, the T-shaped latching arm 420 is identical to the described latching arm 20 except that the arm 420 has a pair of transversely projecting portions 462, 464 that extend in opposite directions and define mounting holes 472, 474 (see FIG. 33). The mounting holes 472, 474 are utilized in providing driving connections with the cables 422, 424 or the rods 432, 434. Headed pins 450 that extend through the holes 472, 474 are used to connect the cables 422, 424 to the projecting portions 462, 464. The rods 432, 434 have right angle end regions 460 that extend into the holes 472, 474. Cotter pins 470 are used to retain the pins 450 and the rod ends 460 in place in the holes 472, 474.

When the latching arm 420 is rotated about the axis of the shaft 22, the projecting portions 462, 464 are caused to pull the cables 422, 424, or to pull the rods 432, 434, to effect operation of suitable latch assemblies (not shown) that are connected to the cables or rods 422, 424, 432, 434.

As will be apparent from the foregoing description, the lock 10 provides a simple and inexpensive structure for releasable securing a closure such as a utility door of a vehicle, or a cabinet door, or the like, in closed position.

Another feature of the lock 10 lies in the fact that its handle 18 can be restrained from rotating when in either of its locking or unlocking positions. When the handle 18 is in either of its locked or unlocked positions, the key operated cylinder 48 can be operated to effect locking or unlocking movement of the control member 42, whereby the lock 10 has a total of four modes (i.e., configurations of its operating components) wherein the handle 18 can be nested in the recess 16, namely:

(i) when the operating handle 18, the shaft 22 and the latching arm 20 are in their latched positions, and the control member 42 is in its locked position, whereby the lock 10 is both "latched" and "locked;"

(ii) when the operating handle 18, the shaft 22 and the latching arm 20 are in their latched positions, and the control member 42 is in its unlocked position, whereby the lock 10 is "latched" but not "locked;"

(iii) when the operating handle 18, the shaft 22 and the latching arm 20 are in their unlatched positions, and the control member 42 is in its unlocked position, whereby the lock 10 is both "unlatched" and "unlocked;" and, (iv) when the operating handle 18, the shaft 22 and the latching arm 20 are in their unlatched positions, and the control member 42 is in its locked position, whereby the lock 10 is "unlatched" but its operating handle 18, shaft 22 and latching arm 20 are restrained from being rotated out of their unlatched position.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. A rotary handle operated, flush mountable door lock, comprising:

(a) housing means including:

(i) a pan-shaped housing member formed as a sheet metal stamping and having:

(1) a substantially flat back wall with opposite sides thereof defining front and rear faces that extend substantially parallel to each other in spaced planes that are separated by a distance equal to the thickness of the back wall;

(2) side wall means formed integrally with the back wall for extending in an uninterrupted and continuous manner about and perimetrically bordering the back wall, and for cooperating with the back wall to define a forwardly facing recess that extends forwardly from the front face of the back wall;

(3) mounting flange means including a substantially flat mounting flange that is formed integrally with the side wall means for extending in an uninterrupted and continuous manner about and perimetrically bordering the side wall means, and that extends in a plane which parallels the back wall and which defines a front boundary of the forwardly facing recess;

(ii) an elongate guide member having:

(1) a pair of substantially flat end portions that extend in a common first plane;

(2) a substantially flat central portion located between the end portions and extending in a second plane that is substantially parallel to but spaced from the first plane;

(3) a pair of substantially flat connecting portions that border opposed edge of the central portion, that extend in spaced parallel planes which intersect the first and second planes and which are substantially perpendicular to first and second planes, and that are formed integrally with the end portions and the central portion, whereby each of the connecting portions functions to connect a separate one of the end portions to a separate one or two opposed edges of the central portion;

(iii) the guide member being rigidly connected to the housing member as by rigidly connecting the spaced end portions to the rear face of the back wall, with the guide member being positioned relative to the housing member such that the common plane of the end portions extends along the rear face of the housing member in parallel relationship thereto, with the central portion of the guide member extending in spaced parallel relationship with a substantially centrally located portion of the back wall, and with the connecting portions cooperating with the central portion of the guide member and with the centrally located portion of the back wall of the housing member to define a guide channel that extends along and in direct contact with the rear face of the back wall to define a guide path of movement that parallels each of the back wall, the central portion and the connecting portions, with the connecting portions defining opposed side boundaries of the guide channel, with the back wall and the central portion defining opposed front and rear boundaries of the guide channel, and with the guide channel being of substantially uniform, generally rectangular cross section having a width that is determined by the spasce between the side boundaries and a thickness that is determined by the space between the front and rear boundaries;

(iv) aligned holes formed through the central portion and through the centrally located portion, with the aligned holes being coaxial about an imaginary shaft rotation axis that extends perpendicularly with respect to the back wall, and with the imaginary shaft rotation axis intersecting the guide channel at a location between and spaced substantially equidistantly from the side boundaries of the guide channel;

(b) shaft means including a shaft extending along the shaft rotation axis through the aligned holes and having a front end region that projects forwardly from the back wall and into the recess, and having a rear end region that projects rearwardly from the back wall, the shaft being rotatable about the shaft rotation axis relative to the housing between latched and unlatched positions;

(c) operating handle mens including an operating handle connected to the front end region of the shaft and being rotatable with the shaft about the shaft rotation axis between the latched and unlatched positions;

(d) a latching arm connected to the rear end region of the shaft and being rotatable therewith about the shaft rotation axis between the latched and unlatched positions;

(e) receiving formation means provided on the shaft at a location wherein said the shaft intersects with the guide channel, with the receiving formation means including a pair of flat surface portions formed on opposed sides of the shaft, with the flat surface portions extending substantially parallel to each other and parallel to the shaft rotation axis, and with the flat surface portions being spaced substantially equidistantly from the shaft rotation axis and at a predetermined distance from each other;

(f) key operated locking means connected to the housing for selectively restraining the handle, the shaft and the latching arm from rotating about the shaft rotation axis when the handle, the shaft and the latching arm are in their latched and unlatched positions, the key operated ocking means including:

(i) control means including an elongated, one-piece control member that has at least a mounting portion that extends into the guide channel and that is slidably connected to the housing means by virtue of the mounting portion of the control means being dimensioned such that its cross section if of generally rectangular form having width and thickness dimensions that are only slightly less than the width and thickness of the guide channel, whereby the control member is mounted on the housing means for smooth sliding movement relative thereto along a guide path of movement that is defined by the guide channel, with the control member being movable along the guide path of movement between locked and unlocked positions, and with such movement being guided by direct engagement of the control member with each of the back wall of the housing, the central portion of the guide member and the connecting portions of the guide member;

(ii) locking formation means defined by the control means in the form of an elongate keyhole shaped slot formed through the control member and having the shaft extending therethrough, with the length of the slot paralleling the guide path of movement, with the slot having relatively small end region at one end thereof and a relatively large end region at the other end thereof, with the relatively small end region being defined in part by a pair of flat side wall portions that extend in parallel relationship to the guide path of movement and along opppsed sides of the keyhole shaped slot at substantially equal distances from the axis of shaft rotation and being spaced from each other at a distance that is selected to permit the flat surface portions of the shaft to be closely received therebetween when the control member is in its locked position to prevent shaft rotation about the shaft rotation axis, and with the relatively large end region of the slot having an enlarged circular formation of suffificent size to loosely surround the shaft and to thereby readily permit rotation of the shaft about the shaft rotation axis when the control member is in its unlocked position;

(ii) key cylinder means for receiving a suitably configured key and having rotatable stem means for rotation relative to the housing in response to rotation of a suitable configured key in the key cylinder means; and, (iv) cam means connected to the rotatable stem means for movement therewith and for drivingly engaging the control means for selectively moving the control member between its locked and unlocked positions, and for cooperating with the control means to selectively retain the control means in its locked and unlocked positions;

(g) the locking formation means and the receiving formation means being operable to engage when the control member has been moved to its locked position to prevent rotation of the handle, the latching arm and the shaft relative to the housing, and being operable to disengage when the control member has been moved to its unlocked position to permit rotation of the handle, the latching arm and the shaft relative to the housing about the shaft rotation axis.

2. The lock of claim 1 wherein:

(a) the rotary movement about the shaft rotation axis that is executed by the handle, the shaft and the latching arm in moving between the latched and the unlatched positions is about 180 degrees; and, (b) the hole that is formed through the back wall of the housing and through which the shaft extends is located closed to one edge of the pan-shaped housing member than to an opposite edge thereof, whereby, when the latching arm is in its latched position it projects beyond said one edge of the housing member to a greater extent than it projects beyond the opposite edge of the housing member when the latching arm is in its unlatched position.

3. The lock of claim 1 wherein:

(a) the key cylinder has a body that is mounted on the housing member, and has key-receiving cylinder that is journaled by the body rotation relative thereto between first and second positions when a key of appropriate configuratioin is inserted into the key-receiving cylinder, with the key-receiving cylinder and the body cooperating to permit removal of the key from the key-receiving cylinder only when the key-receiving cylinder is rotated to one of said first and second positions;

(b) the cam means is connected to the key-receiving cylinder for rotation therewith between said first and second positions; and, (c) the control means and the cam means cooperate to securely retain the control member in its locked position when the key-receiving cylinder is in its first position, and to retain the control member in its unlocked position when the key-receiivng cylinder is in its second position;

(d) whereby the key operated locking means is operative not only to effect movement of the control member between its locked and unlocked positions, but also to securely retain the control member in a selected one of its locked and unlocked positions whenever the key is removed from the key-receiving cylinder, and, inasmuch as the control member is movable to its locked position only when the latching arm either is in its latched or its unlatched position, the lock therefore permits removal of the key from the key-receiving cylinder in each of four orientations of the relatively movable components of the lock, namely:

(i) when the operating handle, the shaft and the latching arm are in their latched positions, and the control member is in its locked positions, whereby the lock is both "latched" and "locked;"

(ii) when the operating handle, the shaft and the latching arm are in their latched positions, and the control member is in its unlocked position, whereby the lock is "latched" but not "locked;"

(iii) when the operating handle, the shaft and the latching arm are in their unlatched positions, and the control member is in its unlocked position, whereby the lock is both "unlatched" and "unlocked;" and, (iv) when the operating handle, the shaft and the latching arm are in their unlatched positions, and the control member is in its locked position, whereby the lock is "unlatched" but its operating handle, shaft and latching arm are restrained from being rotated out of their unlatched position.

4. The lock of claim 3 wherein the range of rotary movement that is excuted by the cam means in moving between said first and second positions is about 90 degrees.

5. The lock of claim 1 wherein the operating handle is pivotally connected to the front end region of the shaft for pivotal movement relative to the shaft between folded and extended positions into and out of nesting relationship with the recess, but with the handle and the recess that is defined by the housing member being configured to permit the handle to nest within the recess only when the handle and the shaft are in their latched and unlatched positions.

6. The lock of claim 5 additionally including resilient means biasing the handle selectively toward one of its folded and extended positions.

7. The lock of claim 1 wherein the control member additionally includes:

(a) U-shaped formation means connected to the control member and having a central part that extends in overlying relationship with the cam means; and, (b) projecting formation means:

(i) for connecting with the central part at spaced positions thereon;

(ii) for extending along opposite sides of the cam means for engaging selected portions of the cam means (1) to move the control member means between its locked and unlocked positions in response to movement of the cam means by the key cylinder between its first and second positions, (2) to retain the control member means in its locked position when the cam means and the key cylinder means are in said first position, and (3) to retain the control member means in its unlocked position when the cam means and the key cylinder means are in said second position.

* * * * *